United States Patent
Gerweck et al.

(10) Patent No.: US 9,946,780 B2
(45) Date of Patent: *Apr. 17, 2018

(54) INTERPRETING RELATIONAL DATABASE STATEMENTS USING A VIRTUAL MULTIDIMENSIONAL DATA MODEL

(71) Applicant: AtScale, Inc., San Mateo, CA (US)

(72) Inventors: Sarah Gerweck, Santa Clara, CA (US); David P. Mariani, Santa Clara, CA (US)

(73) Assignee: AtScale, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/424,890

(22) Filed: Feb. 6, 2017

(65) Prior Publication Data

US 2017/0185663 A1  Jun. 29, 2017

Related U.S. Application Data

(63) Continuation of application No. 14/665,032, filed on Mar. 23, 2015, now Pat. No. 9,600,554.

(Continued)

(51) Int. Cl.
*G06F 17/30* (2006.01)

(52) U.S. Cl.
CPC .. *G06F 17/30592* (2013.01); *G06F 17/30292* (2013.01); *G06F 17/30407* (2013.01);
(Continued)

(58) Field of Classification Search
None
See application file for complete search history.

(56) References Cited

U.S. PATENT DOCUMENTS 6,236,997 B1  5/2001 Bodamer et al.
6,308,178 B1  10/2001 Chang et al.
(Continued)

OTHER PUBLICATIONS https://451research.com/report-short?entityId=92407, 451 Research Impact Report, "Kyvos adds SQL support, availability on Google Cloud for OLAP-on-Hadoop" May 8, 2017, 1 page.
(Continued)

*Primary Examiner* — Sangwoo Ahn
(74) *Attorney, Agent, or Firm* — Patrick E. Caldwell, Esq.; The Caldwell Firm, LLC

(57) ABSTRACT

The present disclosure provides improved systems, methods, and computer program products suited to address the issues with legacy approaches. Specifically, the present disclosure provides a detailed description of techniques used in systems, methods, and in computer program products for interpreting relational database statements using a virtual multidimensional data model. Certain embodiments are directed to technological solutions for receiving a relational database statement comprising relational metadata mapped to a virtual multidimensional representation of a subject database, and generating a subject database statement based at least in part on the relational database statement and the virtual multidimensional representation, and configurable to operate on the subject database to produce a visualization result set, which embodiments advance the technical fields for addressing the problem of projecting a multidimensional data view of a subject database on to a relational data analysis environment to enable real time data analyses, as well as advancing peripheral technical fields.

20 Claims, 14 Drawing Sheets

Related U.S. Application Data

(60) Provisional application No. 61/970,251, filed on Mar. 25, 2014.

(52) U.S. Cl.
CPC .. *G06F 17/30451* (2013.01); *G06F 17/30554* (2013.01); *G06F 17/30595* (2013.01); *G06F 17/30563* (2013.01)

(56) References Cited

U.S. PATENT DOCUMENTS

| | | | |
|---|---|---|---|
| 6,684,207 | B1 | 1/2004 | Greenfield et al. |
| 7,668,878 | B2 | 2/2010 | Arora et al. |
| 7,689,582 | B2 | 3/2010 | Behnen et al. |
| 8,010,554 | B1 | 8/2011 | Zhou |
| 8,041,670 | B2 | 10/2011 | Bakalash |
| 9,600,554 | B2 | 3/2017 | Gerweck et al. |
| 2002/0038348 | A1 | 3/2002 | Malone |
| 2004/0236767 | A1 | 11/2004 | Soylemez et al. |
| 2005/0278290 | A1 | 12/2005 | Bruce |
| 2006/0218117 | A1* | 9/2006 | Gupta ............ G06F 17/30545 |
| 2007/0027904 | A1* | 2/2007 | Chow ............ G06F 17/30592 |
| 2007/0028108 | A1 | 2/2007 | Cowburn |
| 2007/0113076 | A1 | 5/2007 | Cowburn |
| 2007/0208721 | A1 | 9/2007 | Zaman |
| 2009/0018996 | A1 | 1/2009 | Hunt et al. |
| 2009/0249125 | A1 | 10/2009 | Bhatawdekar et al. |
| 2010/0125565 | A1 | 5/2010 | Burger |
| 2011/0252049 | A1 | 10/2011 | Marinescu et al. |
| 2012/0089564 | A1 | 4/2012 | Bakalash et al. |
| 2012/0102453 | A1 | 4/2012 | Patch et al. |
| 2015/0278334 | A1 | 10/2015 | Gerweck et al. |
| 2016/0098037 | A1 | 4/2016 | Zornio |
| 2016/0098448 | A1 | 4/2016 | McShane |
| 2016/0314173 | A1 | 10/2016 | Lydick |
| 2017/0091470 | A1 | 3/2017 | Infante-Lopez |
| 2017/0103105 | A1 | 4/2017 | Barsness |
| 2017/0235786 | A9 | 8/2017 | Faith |

OTHER PUBLICATIONS haps://www.slideshare.net/AtulSharma225/kyvos-insights-datasheet-60646546 "Kyvos insights", Apr. 8, 2016, 2 pages.

International Preliminary Report & Written Opinion of PCT Application No. PCT/US2015/0022082, dated Jun. 25, 2015, 3 pages total.

International Search Report & Written Opinion of PCT Application No. PCT/US2016/031684, dated Oct. 19, 2016, 6 pages total.

https://www.ibm.com/support/knowledgecenter/en/ssw_i5_54/rzajq/rzajqdispatcher.htm, "Query Dispatcher", downloaded May 2, 2017, 1 page.

Data Structures for Databases, Jan. 1, 2001, Hammer, Joachim, 24 pages.

Oauth_2_Framework_rfc6749, Oct. 2012, Hardt, Ed., 76 pages.

* cited by examiner

INTERPRETING RELATIONAL DATABASE STATEMENTS USING A VIRTUAL MULTIDIMENSIONAL DATA MODEL

RELATED APPLICATIONS

The present application claims the benefit of priority to co-pending U.S. patent application Ser. No. 14/665,032, entitled "INTERPRETING RELATIONAL DATABASE STATEMENTS USING A VIRTUAL MULTIDIMENSIONAL DATA MODEL", filed 23 Mar. 2015; and this application claims priority to Provisional U.S. Patent Application Ser. No. 61/970,251, entitled "METHOD FOR INTERPRETING RELATIONAL DATABASE STATEMENTS ON A MULTIDIMENSIONAL DATABASE", filed 25 Mar. 2014, both of which are hereby incorporated by reference in their entirety.

FIELD

This disclosure relates to the field of data analytics, and more particularly to techniques for interpreting relational database statements using a virtual multidimensional data model.

BACKGROUND

With the continued proliferation of information sensing devices (e.g., mobile phones, online computers, RFID tags, sensors, etc.), increasingly larger volumes of data are collected for various business intelligence purposes. For example, the web browsing activities of online users are captured in various datasets (e.g., cookies, log files, etc.) for use by online advertisers in targeted advertising campaigns. Data from operational sources (e.g., point of sale systems, accounting systems, CRM systems, etc.) can also be combined with the data from online sources. Using traditional database structures (e.g., relational) to store such large volumes of data can result in database statements (e.g., queries) that are complex, resource-intensive, and time consuming. Deploying multidimensional database structures enables more complex database statements to be interpreted (e.g., executed) with substantially less overhead. Some such multidimensional models and analysis techniques (e.g., online analytical processing or OLAP) allow a user (e.g., business intelligence analyst) to view the data in "cubes" comprising multiple dimensions (e.g., product name, order month, etc.) and associated cells (e.g., defined by a combination of dimensions) holding a value that represents a measure (e.g., sale price, quantity, etc.). Further, with such large volumes of data from varying sources and with varying structures (e.g., relational, multidimensional, delimited flat file, document, etc.), the use of data warehouses and distributed file systems (e.g., Hadoop distributed file system or HDFS) to store and access data has increased. For example, an HDFS can be implemented for databases using a flat file structure with predetermined delimiters, and associated metadata (e.g., describing the keys for the respective delimited data values), to accommodate a broad range of data types and structures.

While multidimensional models and data warehouses have evolved to accommodate larger volumes of data and more extensive insights into that data, users remain most familiar with the traditional data structures (e.g., relational), query languages (e.g., SQL), and associated analysis tools (e.g., Tableau, Excel, QlikView, etc.), that are commonly used for operational data. In contrast, manipulating data stored using multidimensional data models and data warehouses can require expert computer science skills. The user therefore desires to take full advantage of the multidimensional richness of a broad range of subject data and structures using a familiar relational data analysis environment. Legacy techniques can pre-process and/or transform the subject data (e.g., from the distributed file system or data warehouse) for presentation to the relational data analysis tools. However, such legacy techniques are implemented as batch processes and are limited in resource efficiency, data accuracy, schema flexibility, and other performance characteristics.

The problem to be solved is rooted in technological limitations of the legacy approaches. Improved techniques, and in particular, improved application of technology is needed to address the problem of projecting a multidimensional data view of a subject database on to a relational data analysis environment to enable real-time data analyses. More specifically, the technologies applied in the aforementioned legacy approaches fail to achieve the sought after capabilities of the herein disclosed techniques for interpreting relational database statements using a virtual multidimensional data model, thus techniques are needed to improve the application and efficacy of various technologies as compared with the legacy approaches.

SUMMARY

The present disclosure provides improved systems, methods, and computer program products suited to address the aforementioned issues with legacy approaches. More specifically, the present disclosure provides a detailed description of techniques used in systems, methods, and in computer program products for interpreting relational database statements using a virtual multidimensional data model. The various embodiments address the problem of projecting a multidimensional data view of a subject database on to a relational data analysis environment to enable real-time data analyses. Certain embodiments are directed to technological solutions for receiving a relational database statement (e.g., query) comprising relational metadata mapped to a virtual multidimensional representation of a subject database, and generating a subject database statement based at least in part on the relational database statement and the virtual multidimensional representation, and configurable to operate on the subject database to produce a visualization result set, which embodiments advance the technical fields for addressing the problem of projecting a multidimensional data view of a subject database on to a relational data analysis environment to enable real time data analyses, as well as advancing peripheral technical fields. The disclosed embodiments modify and improve over conventional approaches. In particular, practice of the disclosed techniques reduces use of computer memory, reduces demand for computer processing power, and reduces communication overhead needed for interpreting relational database statements using a virtual multidimensional data model. Some embodiments disclosed herein use techniques to improve the functioning of multiple systems within the disclosed environments.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
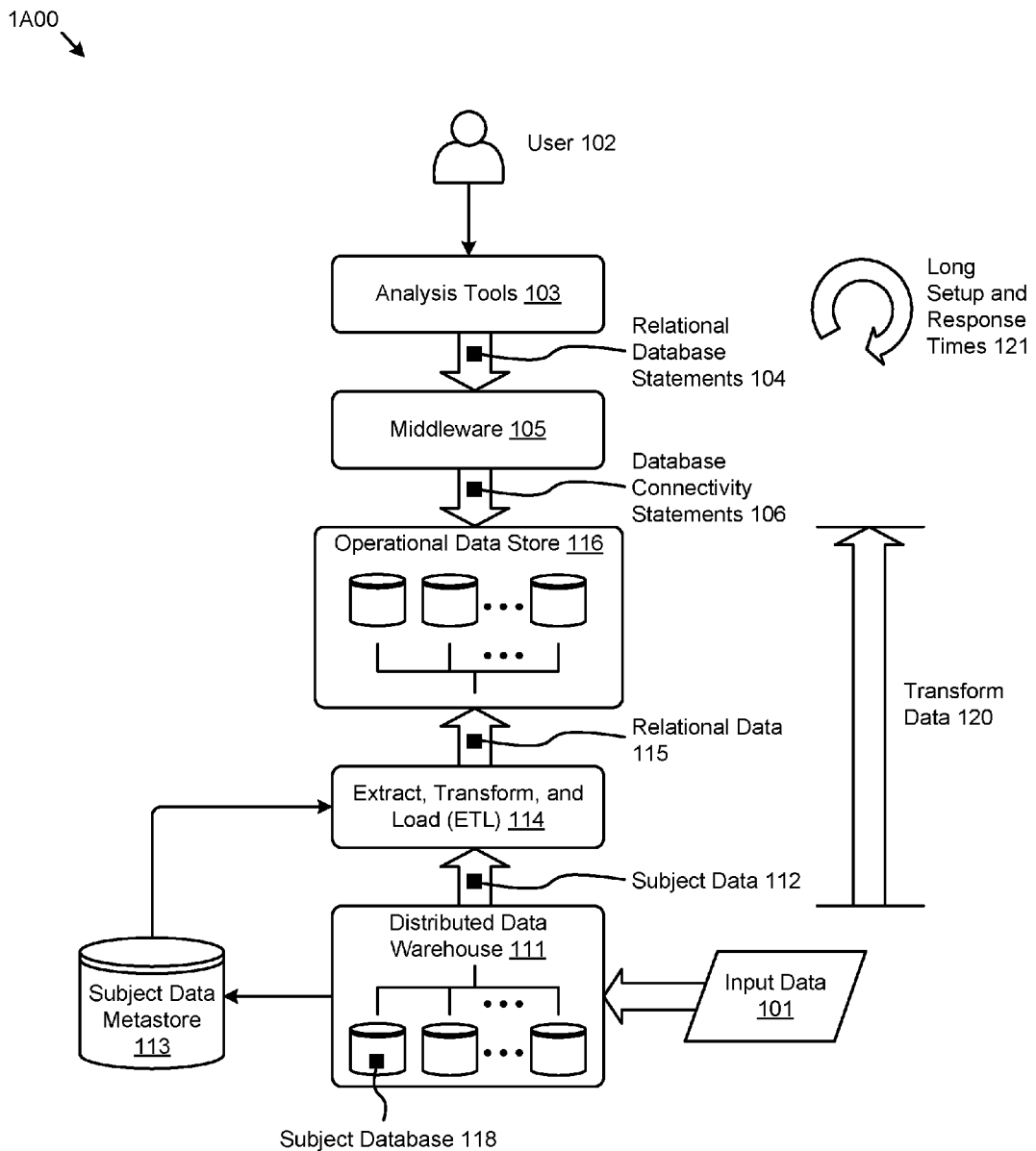
FIG. 1A presents a diagram depicting a data transformation approach for comparison to techniques for interpreting relational database statements using a virtual multidimensional data model.

Some embodiments of the present disclosure address the problem of projecting a multidimensional data view of a subject database on to a relational data analysis environment to enable real-time data analyses and some embodiments are directed to approaches for receiving a relational database statement (e.g., query) comprising relational metadata mapped to a virtual multidimensional representation of a subject database, and generating a subject database statement based at least in part on the relational database statement and the virtual multidimensional representation, and configurable to operate on the subject database to produce a visualization result set. More particularly, disclosed herein and in the accompanying figures are exemplary environments, systems, methods, and computer program products for interpreting relational database statements using a virtual multidimensional data model.

Overview

With the continued proliferation of information sensing devices (e.g., mobile phones, online computers, RFID tags, sensors, etc.), increasingly larger volumes of data are collected for various business intelligence purposes. Data from operational sources (e.g., point of sale systems, accounting systems, CRM systems, etc.) can also be combined with the data from online sources. Using traditional database structures (e.g., relational) to store such large volumes of data can result in database statements (e.g., queries) that are complex, resource-intensive, and time consuming. Deploying multidimensional database structures enables more complex database statements to be run with substantially less overhead. Further, with such large volumes of data from varying sources and with varying structures (e.g., relational, multidimensional, delimited flat file, document, etc.), the use of data warehouses and distributed file systems (e.g., Hadoop distributed file system or HDFS) to store and access data has increased.

While multidimensional models and data warehouses have evolved to accommodate larger volumes of data and more extensive insights into that data, users remain most familiar with the traditional data structures (e.g., relational), query languages (e.g., SQL), and associated analysis tools (e.g., Tableau, Excel, QlikView, etc.), that are commonly used for operational data. Legacy techniques can pre-process and/or transform the subject data (e.g., from the distributed file system or data warehouse) for presentation to the relational data analysis tools. However, such legacy techniques are implemented as batch processes and are limited in resource efficiency, data accuracy, schema flexibility, and other performance characteristics. Specifically, legacy techniques require additional computing resources to perform the continuous transformation and pre-processing of the subject data, and additional data storage capacity for storing the transformed subject data.

To address the need to project a multidimensional data view of a subject database on to a relational data analysis environment to enable real-time data analyses, the techniques described herein generate a virtual multidimensional representation (e.g., OLAP cube view) of the subject data that is mapped to relational metadata the user can use to issue relational statements (e.g., queries) on the subject database (e.g., HDFS database). By using a virtual multidimensional representation of the underlying data, a broad range of queries (e.g., using various dimensions and measures) can be dynamically generated and executed in real-time on the original subject data. Various embodiments as disclosed herein serve to improve the functioning of the computing and storage system by reducing the processing resources and storage footprint needed by legacy approaches. For example, data transformation of the subject database and pre-processing tasks performed over the subject database, as well as large storage capacity for the transformed data, are not required using the herein disclosed techniques.

In some embodiments, interpreting relational database statements using a virtual multidimensional data model can be implemented by receiving a relational database statement (e.g., query) comprising relational metadata mapped to a virtual multidimensional representation (e.g., OLAP cube) of a subject database. A subject database statement can then be generated, based at least in part on the relational database statement and the virtual multidimensional representation, and configurable to operate on the subject database to produce a visualization result set. In one or more embodiments, metadata describing the subject database can be used to build the virtual multidimensional representation. In one or more embodiments, data relationships (e.g., hierarchies, groupings, etc.), explicit and/or inferred, can be included with the dimensions and measures that comprise the virtual multidimensional representation. In one or more embodiments, measures can also be aggregated and/or calculated.

Various embodiments are described herein with reference to the figures. It should be noted that the figures are not necessarily drawn to scale and that the elements of similar structures or functions are sometimes represented by like reference numerals throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A presents a diagram 1A00 depicting a data transformation approach for comparison to techniques for interpreting relational database statements using a virtual multidimensional data model. As an option, one or more instances of diagram 1A00 or any aspect thereof may be implemented in the context of the architecture and functionality of the embodiments described herein. Also, the diagram 1A00 or any aspect thereof may be implemented in any desired environment.

The shown diagram 1A00 depicts a legacy approach for analyzing non-relational data and/or large volumes of data from a relational data analysis environment. Specifically, diagram 1A00 shows a user 102 (e.g., business intelligence analyst) interacting with a set of analysis tools 103 (e.g., Tableau, Excel, QlikView, etc.) that can generate various instances of relational database statements 104 to be interpreted on associated relational datasets. The relational database statements 104 from the variety of analysis tools 103 are conformed to database connectivity statements 106 (e.g., using ODBC, JDBC, OLE-DB, etc.) by a set of middleware 105. In some cases, user 102 may want to perform analyses on a set of input data 101 (e.g., mobile activity, social network activity, transactions, CRM activity, etc.) that is stored in a subject database 118 (e.g., as flat file data, multidimensional data, etc.) in a distributed data warehouse 111. As an example, the distributed data warehouse 111 can be configured using the HDFS framework. However, the relational database statements 104 issued by the analysis tools 103 are not configurable to be interpreted on the subject database 118 stored in the distributed data warehouse 111.

The legacy approach depicted in diagram 1A00 for enabling the relational database statements 104 issued by the analysis tools 103 to be interpreted on the subject database 118, transforms a set of subject data 112 comprising the subject database 118 to one or more new sets of relational data 115 (see operation 120). Specifically, the legacy approach performs an extract, transform, and load (ETL) function on the subject data 112 based at least in part on subject metadata included in a subject data metastore 113 (e.g., database definitions, schema definitions, etc.). The resulting set of relational data 115 is stored in an operational data store 116 for access by the analysis tools 103. In some cases, the subject data 112 is apportioned into multiple operational databases or data marts. While the operational data store 116 can be configured for access using relational database statements 104 issued by the analysis tools 103, this legacy approach has several limitations, including long setup and query response times (see operation 121). Specifically, an ETL function 114 is performed as a batch process, such that the user 102 is delayed in querying the data until the ETL function 114 has executed. Also, the data in the operational data store 116 that is queried by the relational database statements 104 may not include the most recent set of input data 101 recorded in the distributed data warehouse 111. Further, since the ETL function 114 is a predetermined batch process, the databases and/or data marts produced for the operational data store 116 may not be optimized for the specific statements and queries issued by the user 102, and may result in slow query response times and/or non-executable queries. Such limitations are increasingly restrictive with increasing data volume and complexity (e.g., high cardinality of dimensions).

Figure 1B:
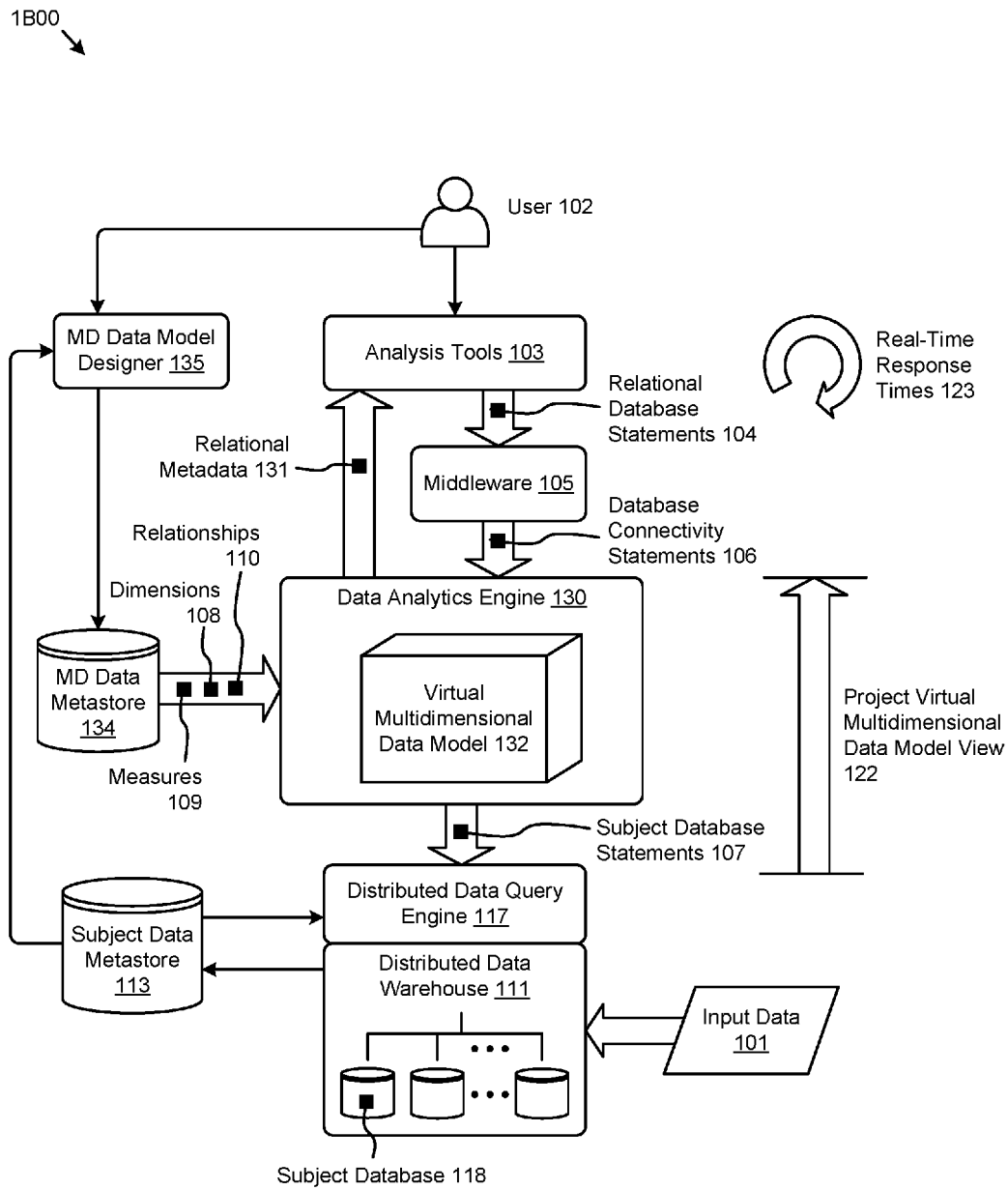
FIG. 1B depicts a diagram illustrating techniques for interpreting relational database statements using a virtual multidimensional data model, according to an embodiment.

A new approach is therefore needed to enable the user 102 to perform real-time analyses on one or more subject databases (e.g., subject database 118) stored in the distributed data warehouse 111 using a relational database environment (e.g., analysis tools 103 and relational database statements 104). FIG. 1B and the herein disclosed techniques describe such an approach.

FIG. 1B depicts a diagram 1B00 illustrating techniques for interpreting relational database statements using a virtual multidimensional (MD) data model, according to an embodiment. As an option, one or more instances of diagram 1B00 or any aspect thereof may be implemented in the context of the architecture and functionality of the embodiments described herein. Also, the diagram 1B00 or any aspect thereof may be implemented in any desired environment.

As shown in FIG. 1B, diagram 1B00 comprises the user 102, the analysis tools 103, the middleware 105, the distributed data warehouse 111 (e.g., receiving the input data 101 and storing the subject database 118), and the subject data metastore 113 introduced in FIG. 1A and diagram 1A00. The approach shown in diagram 1B00 and described herein for enabling the relational database statements 104 issued by the analysis tools 103 to be interpreted on the subject database 118 (e.g., flat file data, multidimensional data, etc.) in the distributed data warehouse 111, uses a data analytics engine 130 to project a virtual multidimensional data model representation (e.g., view) of the subject database 118 on the relational database environment (see operation 122). More specifically, the relational database statements 104 (e.g., SQL query) and associated database connectivity statements 106 received by the data analytics engine 130 conform to a set of relational metadata 131 (e.g., describing a relational database structure) that is mapped to a virtual multidimensional data model 132 of the subject database 118, and generates a set of subject database statements 107 based at least in part on the relational database statements 104 and the virtual multidimensional data model 132. The subject database statements 107 can then be communicated to (e.g., via a network access port) and executed by a distributed data query engine 117. In one or more embodiments, the distributed data query engine 117 can be a Structured Query Language (SQL) based query engine for accessing distributed file systems (e.g., Impala, SparkSQL, Tez, Drill, Presto, etc.). Other query engine configurations and partitions are possible. The approach shown in diagram 1B00 allows existing tools and knowledge associated with relational databases to be used in combination with multidimensional data structures, conveying the speed and resource advantages of the multidimensional data structure without the need for a new interface method.

In some embodiments, the virtual multidimensional data model 132 and the relational metadata 131 can be based at least in part on a set of dimensions 108, a set of measures 109, and a set of relationships 110 comprising a set of multidimensional metadata stored in a multidimensional data metastore 134. The dimensions 108, measures 109, and relationships 110 describe one or more virtual multidimensional data cubes that comprise the virtual multidimensional data model 132 of the subject database 118. In other embodiments, the user 102 can define the dimensions 108, measures 109, and relationships 110 (e.g., based at least in part on information from the subject data metastore 113) using a multidimensional data model designer 135. In one or more embodiments, the multidimensional data model designer 135 can comprise a user interface and program code to enable various operations, such as the selection of the dimensions 108, measures 109, and relationships 110.

The approach depicted in diagram 1B00 and described herein has several advantages in comparison to legacy approaches, including real-time response times (see operation 123). Specifically, there is no extraction, transformation, or loading of the underlying data, such that there is no need to wait for batch processes to complete and issued queries operate directly on the current data in the distributed data warehouse 111 (e.g., subject database 118). Further, the virtual multidimensional data model 132 enables a broad range of queries (e.g., using various sets of dimensions 108, measures 109, and relationships 110) to be dynamically generated and executed in real-time on the original data in the subject database 118. A flow for using (e.g., by user 102) the approach shown in diagram 1B00 is described in FIG. 1C.

Figure 1C:
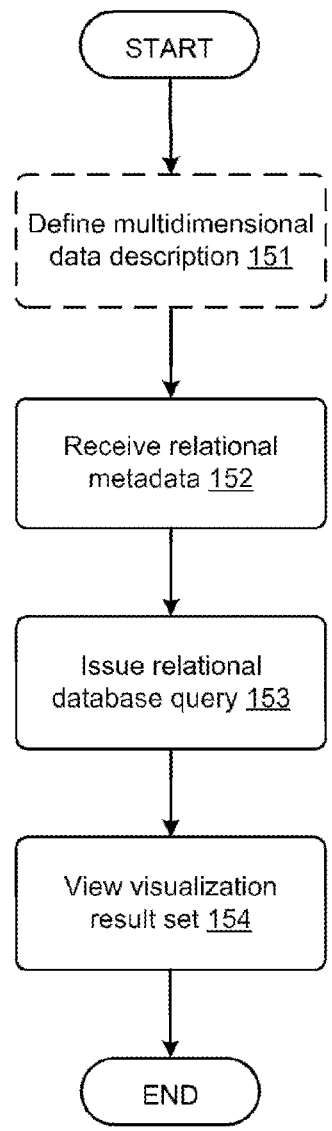
FIG. 1C is a flow for using a system for interpreting relational database statements using a virtual multidimensional data model, according to an embodiment.

FIG. 1C is a flow 1C00 for using a system for interpreting relational database statements using a virtual multidimensional data model, according to an embodiment. As an option, one or more instances of flow 1C00 or any aspect thereof may be implemented in the context of the architecture and functionality of the embodiments described herein. Also, the flow 1C00 or any aspect thereof may be implemented in any desired environment.

As shown in FIG. 1C, flow 1C00 starts with a user (e.g., user 102) defining a multidimensional description of at least a portion of the data in the subject database (see step 151). In some embodiments, step 151 can be optional or performed by another user (e.g., data model designer). More specifically, referring to FIG. 1B, step 151 can be performed using the multidimensional data model designer 135 and can generate any number of dimensions 108, any number of measures 109, and any number of relationships 110, based at least in part on information in the subject data metastore 113. The flow 1C00 continues to receiving relational metadata (e.g., relational metadata 131) describing the multidimensional view of the subject data (see step 152). Using the received relational metadata, one or more relational database statements (e.g., relational database statements 104) can be formulated and issued (see step 153). In one or more embodiments, the relational database statements are based at least in part on the relational metadata and are issued from a relational database environment. In response to issuing the relational database statements, the user can then view the visualization result set (see step 154). For example, user 102 can use analysis tools 103 to issue an SQL query (see step 153) on the subject database 118 and view a graph of the results (see step 154).

Figure 2:
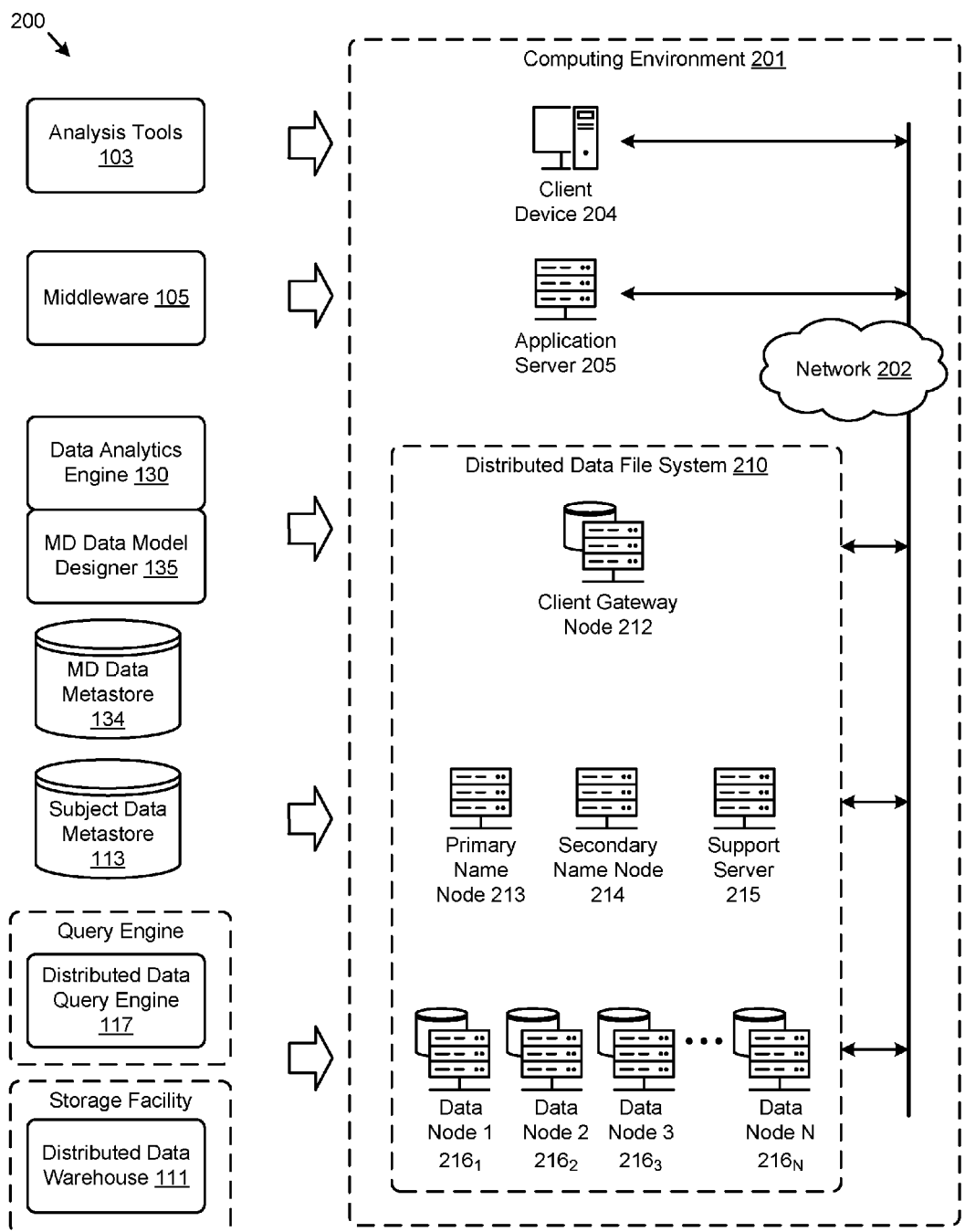
FIG. 2 is a schematic of an environment for implementing a system for interpreting relational database statements using a virtual multidimensional data model, according to an embodiment.

FIG. 2 is a schematic 200 of an environment for implementing a system for interpreting relational database statements using a virtual multidimensional data model, according to an embodiment. As an option, one or more instances of schematic 200 or any aspect thereof may be implemented in the context of the architecture and functionality of the embodiments described herein. Also, the schematic 200 or any aspect thereof may be implemented in any desired environment.

As shown in FIG. 2, a computing environment 201 comprises one or more instances of a client device 204 (e.g., a desktop computer), one or more instances of an application server 205, and one or more instances of a distributed data file system 210. The aforementioned devices, servers, and systems can communicate through a network 202 (e.g., a wireless network, a wide area network (WAN), a local area network (LAN), the Internet, an intranet, a private network, etc.). More specifically, the distributed data file system 210 can be configurable to store and process large volumes of data (e.g., using an HDFS framework) and comprise one or more instances of a client gateway node 212, one or more instances of a primary name node 213, one or more instances of a secondary name node 214, one or more instances of a support server 215 (e.g., executing data analysis processes, etc.), and a plurality of data nodes 216 (e.g., data node 1 $216_1$, data node 2 $216_2$, data node 3 $216_3$, to data node N $216_N$). The distributed data file system 210 is configurable to store large files of data across multiple computing devices (e.g., the plurality of data nodes 216), rather than store all of the files on a single computing device with a large amount of storage capacity. To accommodate such distributed storage, the plurality of data nodes 216 can be configured with one or more rack-mounted servers coupled (e.g., using SATA or SAS interconnects) to multiple hard disk drives for storing the data. As an example, when a file is loaded into distributed data file system 210, it is replicated and partitioned into "blocks" of data, which are distributed and stored across the plurality of data nodes 216. The primary name node 213 is responsible for storage and management of metadata associated with the distributed data file system 210, such that, for example, the primary name node 213 can provide data location information for data processing operations. Further, other configurations, partitions, and architectures of the distributed data file system 210 shown in computing environment 201 are possible. For example, a single-node implementation may have all of the nodes (e.g., client gateway node 212, primary name node 213, the plurality of data nodes 216, etc.) reside on a single computing device. Also, a small cluster of two nodes may have a first computing device operate as a name node and a second computing device operate as a data node. Further, the distributed data file system 210 can represent any database management system.

In one or more embodiments, the aforementioned devices, servers, and systems in computing environment 201 can be configurable to implement techniques for interpreting relational database statements using a virtual multidimensional data model as described in FIG. 1B and herein. Specifically, the schematic 200 associates the components described in FIG. 1B with the client device 204, the application server 205, and the distributed data file system 210 of computing environment 201. More specifically, as shown in FIG. 2, the client device 204 (e.g., operated by user 102) can store program instructions corresponding to the operations of the analysis tools 103. Also, the application server 205 in computing environment 201 can store program instructions corresponding to the operations of the middleware 105. Further, the client gateway node 212 can store program instructions corresponding to the operations of the data analytics engine 130 and the multidimensional data model designer 135. In some embodiments, the operations of the middleware 105 can also be executed by the data analytics engine 130 on the client gateway node 212. The multidimensional data metastore 134 can also be stored in storage facility (e.g., one or more hard disk drives) coupled to the client gateway node 212. Further, the subject data metastore 113 can be stored in storage facility (e.g., one or more hard disk drives) coupled to the primary name node 213. The data and databases distributed across the plurality of data nodes 216 can be operated over by a query engine such as distributed data query engine 117 that communicates with a storage facility such as the distributed data warehouse 111.

Figure 3:
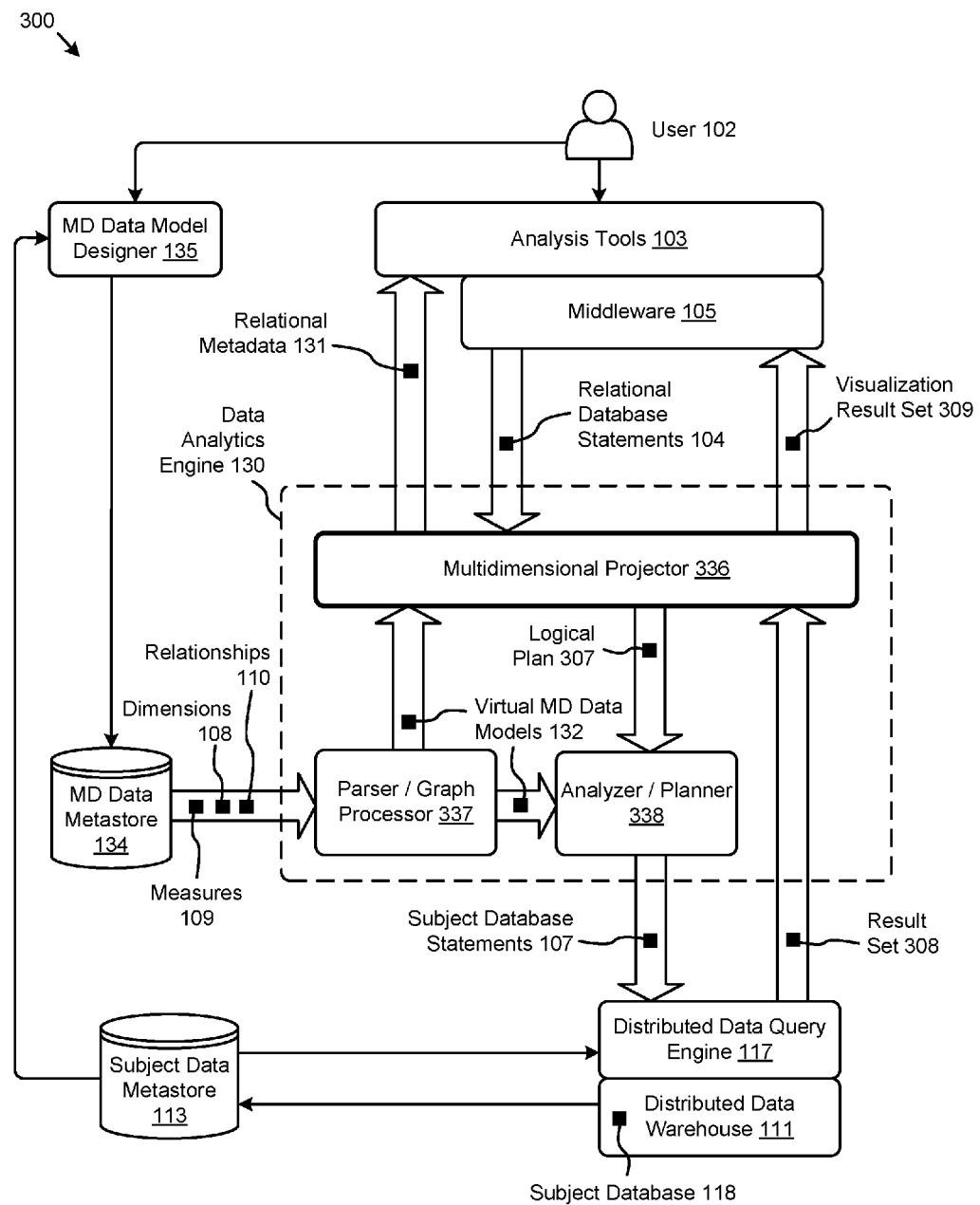
FIG. 3 shows a block diagram of a system for interpreting relational database statements using a virtual multidimensional data model, according to an embodiment.

FIG. 3 shows a block diagram 300 of a system for interpreting relational database statements using a virtual multidimensional data model, according to an embodiment.

As an option, one or more instances of block diagram 300 or any aspect thereof may be implemented in the context of the architecture and functionality of the embodiments described herein. Also, the block diagram 300 or any aspect thereof may be implemented in any desired environment.

The block diagram 300 illustrates an embodiment of the herein disclosed techniques for interpreting relational database statements using a virtual multidimensional data model. As shown, block diagram 300 comprises the components described in FIG. 1B with more details to further describe the herein disclosed techniques and approach. Specifically, the data analytics engine 130 is shown to further comprise a multidimensional projector 336, a parser and graph processor 337, and an analyzer and planner 338. More specifically, the parser and graph processor 337 receives a metadata file (e.g., XML file, text file, etc.) comprising the dimensions 108, measures 109, and relationships 110 selected by the user 102 using the multidimensional data model designer 135 and generates the virtual multidimensional data model 132. The metadata file itself and/or any dimensions 108, measures 109, and/or relationships 110 can correspond to a single data set (e.g., subject database 118) or can correspond to multiple data sets.

The parser portion of the parser and graph processor 337 parses the metadata file to extract the dimensions 108, the measures 109, and relationships 110. In some cases, a portion of the relationships 110 can describe hierarchies for respective dimensions. For example, a selected dimension "orderdatekey" may have an associated hierarchy with levels of order "year", order "month", and order "day", wherein "day" has a child relationship to "month", and "month" has a child relationship to "year". The graph processor portion of the parser and graph processor 337 receives the parsed information and generates the virtual multidimensional data model 132 (e.g., represented by a set of programming code objects) for use by the multidimensional projector 336 and analyzer and planner 338. The virtual multidimensional data model 132 can comprise one or more multidimensional data cubes representing the subject database 118 in the distributed data warehouse 111 and based at least in part on the dimensions 108, measures 109, and relationships 110. The graph processor portion of the parser and graph processor 337 also infers any additional relationships between the dimensions 108 and measures 109 and includes them in the virtual multidimensional data model 132. For example, the aforementioned hierarchy of order "year", order "month", and order "day" will have an implicit relationship between order "day" and order "year".

The information describing the virtual multidimensional data model 132 is presented to the user 102 (e.g., through analysis tools 103) as a set of relational metadata 131. The relational metadata 131 is a result of an association (e.g., mapping, "flattening") of the virtual multidimensional data model 132 to relational database terms. For example, such mapping can associate virtual cubes with tables, virtual cube dimension attributes to columns, and virtual cube measure attributes to row values. More specifically, for example, the aforementioned dimension "orderdatekey" and associated hierarchy of order "year", order "month", and order "day", can be mapped to the flat relational columns of "Order Year", "Order Month", and "Order Day", respectively.

The user 102 uses the relational metadata 131 to specify the relational database statements 104 to be interpreted on one or more subject databases (e.g., subject database 118) in the distributed data warehouse 111. As shown, the relational database statements 104 can be received by the multidimensional projector 336 to generate a logical plan 307. The logical plan 307 results from a mapping by the multidimensional projector 336 of the relational database statements 104 on to the virtual multidimensional data model 132. The logical plan 307 is received by the analyzer and planner 338 to determine the optimal query strategy and structure (e.g., joins, unions, sequencing, aggregations, etc.) of the subject database statements 107 for evaluating the logical plan 307 on the one or more subject databases in the distributed data warehouse 111. For example, the logical plan 307 can be a programming code object representation of the relational database statements 104 that is converted to a "physical plan" (e.g., comprising the subject database statements 107) conforming to a query language that can be executed by a query engine. For the embodiment and example shown in FIG. 3, the subject database statements 107 are delivered by the analyzer and planner 338 to the distributed data query engine 117 and a result set 308 is returned. The result set 308 is received by the multidimensional projector 336 and converted to a visualization result set 309 for interpretation and display by the analysis tools 103. In one or more embodiments, the visualization result set 309 are in a format compatible with the format of the relational database statements 104. For example, the visualization result set 309 can include orderings and groupings specified by the relational database statements 104 (e.g., queries). Unspecified orderings and groupings can also be derived from the virtual multidimensional data model 132 or from any other suitable source.

Figure 4A:
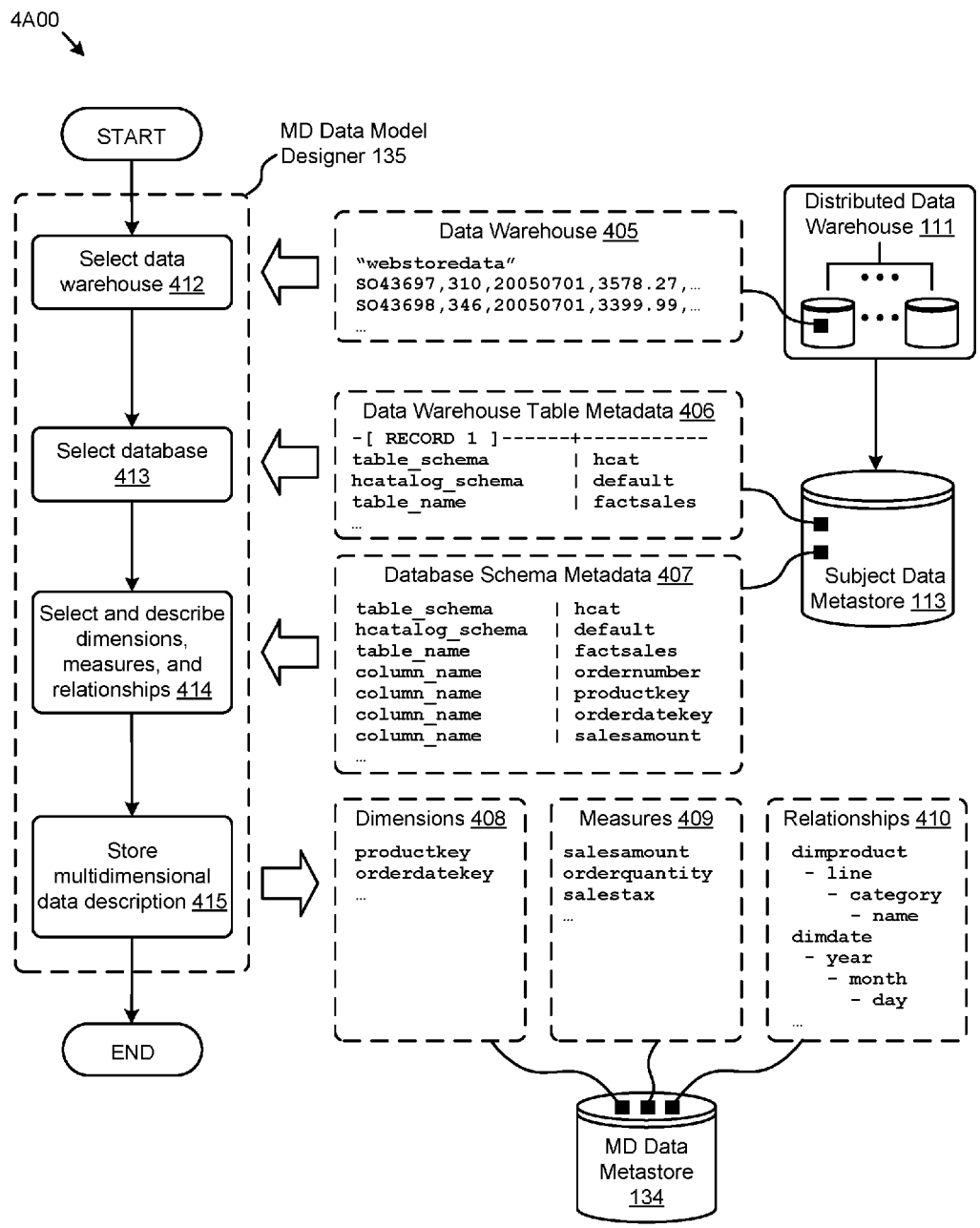
FIG. 4A presents a flow for defining a multidimensional data description in systems for interpreting relational database statements using a virtual multidimensional data model, according to an embodiment.
Figure 4B:
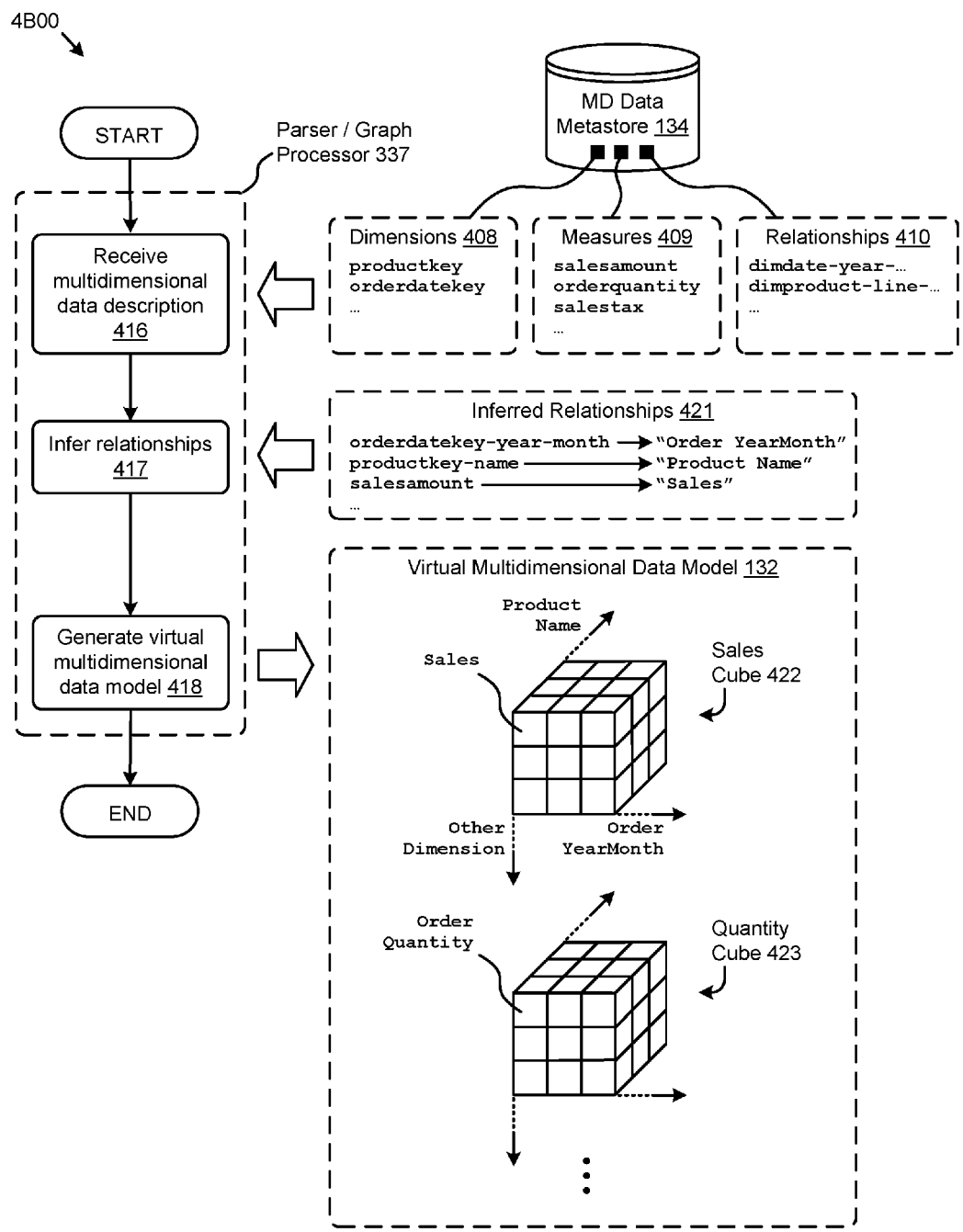
FIG. 4B illustrates a flow for generating a virtual multidimensional data model in systems for interpreting relational database statements using a virtual multidimensional data model, according to an embodiment.

One embodiment of the techniques for generating the aforementioned information comprising the multidimensional data metastore 134 and the virtual multidimensional data model 132 is described in FIG. 4A and FIG. 4B.

FIG. 4A presents a flow 4A00 for defining a multidimensional data description in systems for interpreting relational database statements using a virtual multidimensional data model, according to an embodiment. As an option, one or more instances of flow 4A00 or any aspect thereof may be implemented in the context of the architecture and functionality of the embodiments described herein. Also, the flow 4A00 or any aspect thereof may be implemented in any desired environment.

The flow 4A00 presents one embodiment of a set of steps and associated examples for determining a multidimensional data description of a subject database for use in systems for interpreting relational database statements using a virtual multidimensional data model. In one or more embodiments, the steps and underlying operations comprising the flow 4A00 can be invoked by a user (e.g., the user 102) at the multidimensional data model designer 135. Specifically, flow 4A00 starts with selecting a data warehouse 405 from available (e.g., connected) warehouses, such as distributed data warehouse 111 (see step 412). For example, as shown, the data warehouse "webstoredata" comprising comma-delimited flat file data can be selected. In one or more embodiments, the data comprising the data warehouse can be distributed across multiple computing devices and/or storage devices (e.g., in an HDFS). The flow 4A00 continues with selecting a database (e.g., a representation of or instance of subject database 118) from the data warehouse (see step 413). For example, the database "factsales" can be selected from the data warehouse table metadata 406 stored in the subject data metastore 113 (e.g., a Hive metastore). The flow 4A00 continues with selecting and describing the dimensions, measures, and relationships (see step 414) desired to be included in a multidimensional analysis of the selected subject database. For example, as shown, a set of dimensions 408 comprising "productkey" and "orderdatekey", and a set of measures 409 comprising "salesamount", "orderquantity", and "salestax" can be selected from the database schema metadata 407 from the subject data metastore 113. In some cases, a set of relationships 410 (e.g., hierarchies) can be associated with one or more dimensions. As an example, the selected dimension "product key" may have an associated "dimproduct" hierarchy of product "line", product "category", and product "name". As another example, the selected dimension "orderdatekey" may have an associated "dimdate" hierarchy of order "year", order "month", and order "day". In some embodiments, hierarchies can be defined in tables associated with the subject database in the data warehouse. In other embodiments, the hierarchies can be defined by the user (e.g., using the multidimensional data model designer 135). Further, some measures can be calculated measures (e.g., aggregated measures, etc.). For example, "salestax" may be calculated from the product of the measure "salesamount" and another measure "taxrate". Describing the dimensions, measures, and relationships can include associating names and descriptions, among other operations. For example, the measure "salesamount" can be assigned the name "Sales". When all the desired dimensions, measures, and relationships have been selected and defined, the flow 4A00 continues with storing the multidimensional data description (e.g., dimensions 408, measures 409, hierarchies, relationships, dependencies, etc.) in the multidimensional data metastore 134 (see step 415).

FIG. 4B describes one embodiment of the techniques for generating a virtual multidimensional data model from the multidimensional data description stored in the multidimensional data metastore 134.

FIG. 4B illustrates a flow 4B00 for generating a virtual multidimensional data model in systems for interpreting relational database statements using a virtual multidimensional data model, according to an embodiment. As an option, one or more instances of flow 4B00 or any aspect thereof may be implemented in the context of the architecture and functionality of the embodiments described herein. Also, the flow 4B00 or any aspect thereof may be implemented in any desired environment.

The flow 4B00 presents one embodiment of a set of steps and associated examples for determining a virtual multidimensional data model of a subject database for use in systems for interpreting relational database statements using a virtual multidimensional data model. In one or more embodiments, the steps and underlying operations comprising the flow 4B00 can be executed by program instructions stored on the parser and graph processor 337 included in the data analytics engine 130. Specifically, flow 4B00 starts with receiving a multidimensional data description (see step 416). For example, the multidimensional data description can comprise the dimensions 408, the measures 409, and any number of occurrences of relationships 410 (e.g., hierarchies, dependencies, associations, etc.) and/or other attributes stored in the multidimensional data metastore 134. The flow 4B00 continues with inferring a set of relationships associated with the received multidimensional data description (see step 417). For example, the dimension "orderdatekey" and associated data hierarchy of "year" to "month" can be captured in a single attribute named "Order Year-Month", as shown in a set of inferred relationships 421. Other possible explicit and inferred relationships associated with the dimensions and measures can also be flagged and assigned an identifier and other attributes.

The flow 4B00 then continues with generating a virtual multidimensional data model (e.g., virtual multidimensional data model 132) based at least in part on the dimensions 408, the measures 409, the relationships 410, and the inferred relationships 421 (see step 418). In some cases, the virtual multidimensional data model 132 can comprise multiple virtual data cubes representing various multidimensional views of the underlying subject database (e.g., database "factsales"). Specifically, as shown, the virtual multidimensional data model 132 comprises a sales cube 422 and a quantity cube 423. The sales cube 422 is defined by the dimensions "Product Name", "Order YearMonth", and "Other Dimension" (e.g., geographic region), with each cell holding a "Sales" amount for a respective combination of dimension values (e.g., "widgetA", "2014-January", and "North America", respectively). The quantity cube 423 is also defined by three dimensions, with each cell holding an "Order Quantity" amount for a respective combination of dimension values. Any number of virtual data cubes having any number of dimensions and measures can be included in the virtual multidimensional data model 132. Further, in one or more embodiments, the virtual data cubes can be predetermined and/or dynamically generated based at least in part on an issued query (e.g., relational database statements 104 issued by user 102). Generation of the virtual data cubes and the virtual multidimensional data model 132 can be by any algorithm, including algorithms running on static or dynamic rulesets, machine learning algorithms, and/or any other suitable algorithm.

In one or more embodiments, the virtual data cubes can also be defined by a subset of all available dimensions. For example, the subset of dimensions can be selected based on importance and/or relevance, wherein importance and/or relevance can be determined by examining the respective dimensions the context of the model. More specifically, a dimension over which measure values change dramatically between incremental values of the dimension might be considered more important than another dimension over which measure values change only slightly between dimension increments. As another example, there might not be a significant difference in sold units between cities in the same state, so the city dimension may not be included in a virtual cube. For comparison, if there is a large difference in sold units between states, the state dimension may be included in a virtual cube included in the virtual multidimensional data model 132. As another example, a dimension may be considered more relevant if it has fewer values. More specifically, "product" might be a more relevant dimension than "hour" for "sales" if there are only three products. Importance and/or relevance may additionally or alternatively be determined by examining the dimensions given external context. For example, the names of dimensions may be compared to a keyword database, and certain dimension names can correspond to higher importance and/or relevance.

Figure 4C:
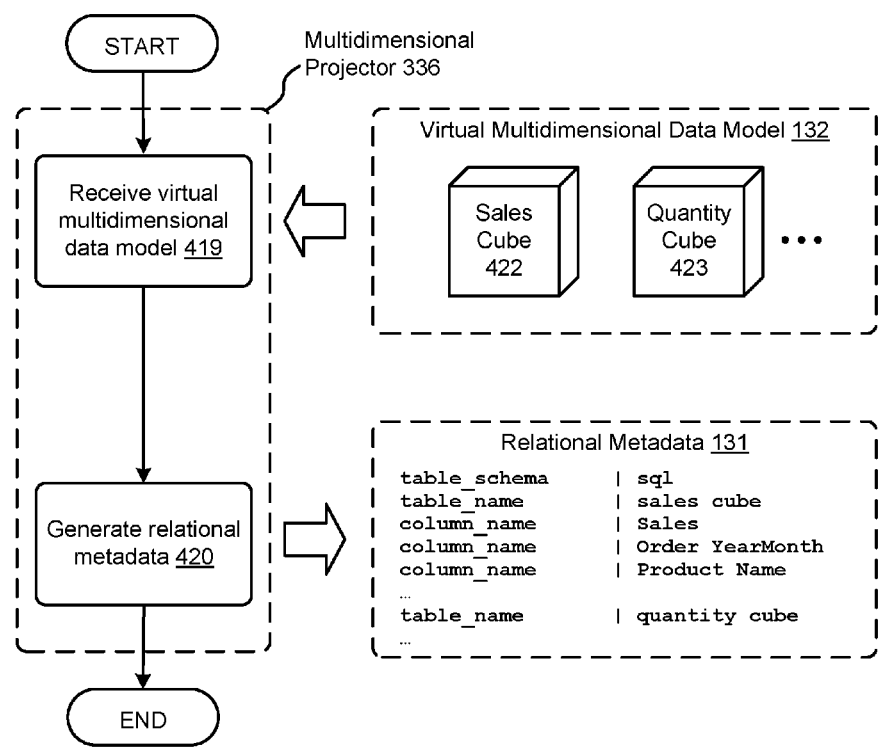
FIG. 4C depicts a flow for presenting relational metadata to a user of systems for interpreting relational database statements using a virtual multidimensional data model, according to an embodiment.

FIG. 4C depicts a flow 4C00 for presenting relational metadata to a user of systems for interpreting relational database statements using a virtual multidimensional data model, according to an embodiment. As an option, one or more instances of flow 4C00 or any aspect thereof may be implemented in the context of the architecture and functionality of the embodiments described herein. Also, the flow 4C00 or any aspect thereof may be implemented in any desired environment.

The flow 4C00 presents one embodiment of a set of steps and associated examples for determining and presenting a set of relational metadata used for constructing relational database statements for interpretation on a subject database (e.g., non-relational database) using a virtual multidimensional data model. In one or more embodiments, the steps and underlying operations comprising the flow 4C00 can be executed by program instructions stored on the multidimensional projector 336 included in the data analytics engine 130. Specifically, flow 4C00 starts with receiving a virtual multidimensional data model (see step 419). For example, the virtual multidimensional data model 132 can be received and can comprise multiple virtual data cubes (e.g., sales cube 422, quantity cube 423, etc.) representing the subject database. The flow 4C00 continues with generating a set of relational metadata (e.g., relational metadata 131) from the virtual multidimensional data model 132. Specifically, step 420 can include mapping one or more virtual multidimensional cube representation to one or more relational tables, and generating metadata (e.g., schema) to describe the tables. In one or more embodiments, the virtual multidimensional data model 132 can be mapped to a single table. In some embodiments, the virtual multidimensional data model 132 can be mapped to multiple tables. More specifically, the mapping can be to individual joinable tables represented by a virtual star schema. If there are multiple virtual multidimensional data cubes comprising the virtual multidimensional data model 132, the virtual multidimensional data cubes can be mapped to different tables within a single schema. Additionally or alternatively, the multidimensional data models may be mapped to different tables in separate schemas, may be mapped to the same table, or may be mapped in any other suitable way. Step 420 may additionally or alternatively include receiving a configuration value to determine which mapping method to use (e.g., whether to map multiple virtual multidimensional data cubes to separate schemas or the same schema).

Figure 5A:
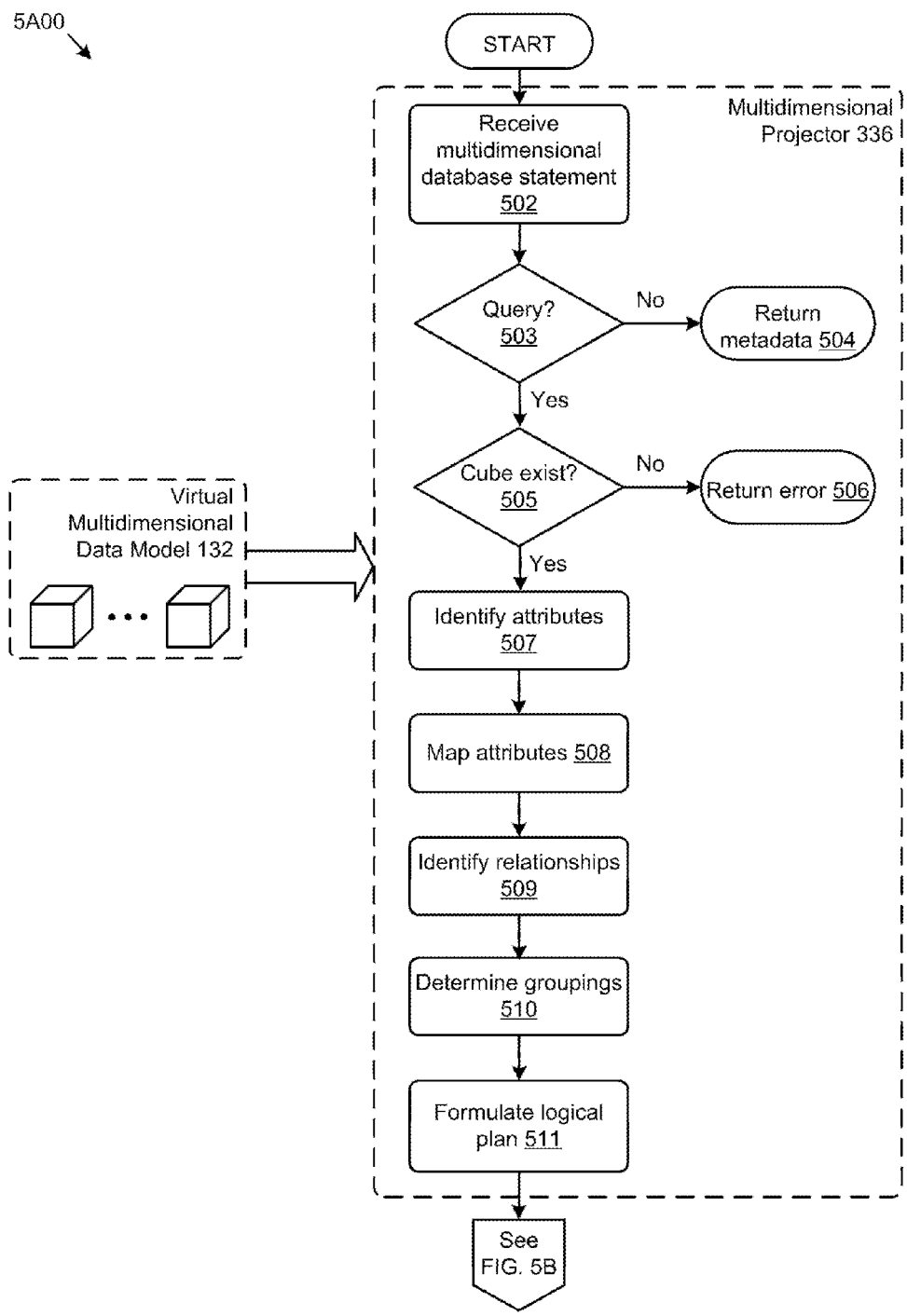
FIG. 5A shows a flow for formulating a logical plan in systems for interpreting relational database statements using a virtual multidimensional data model, according to an embodiment.
Figure 5B:
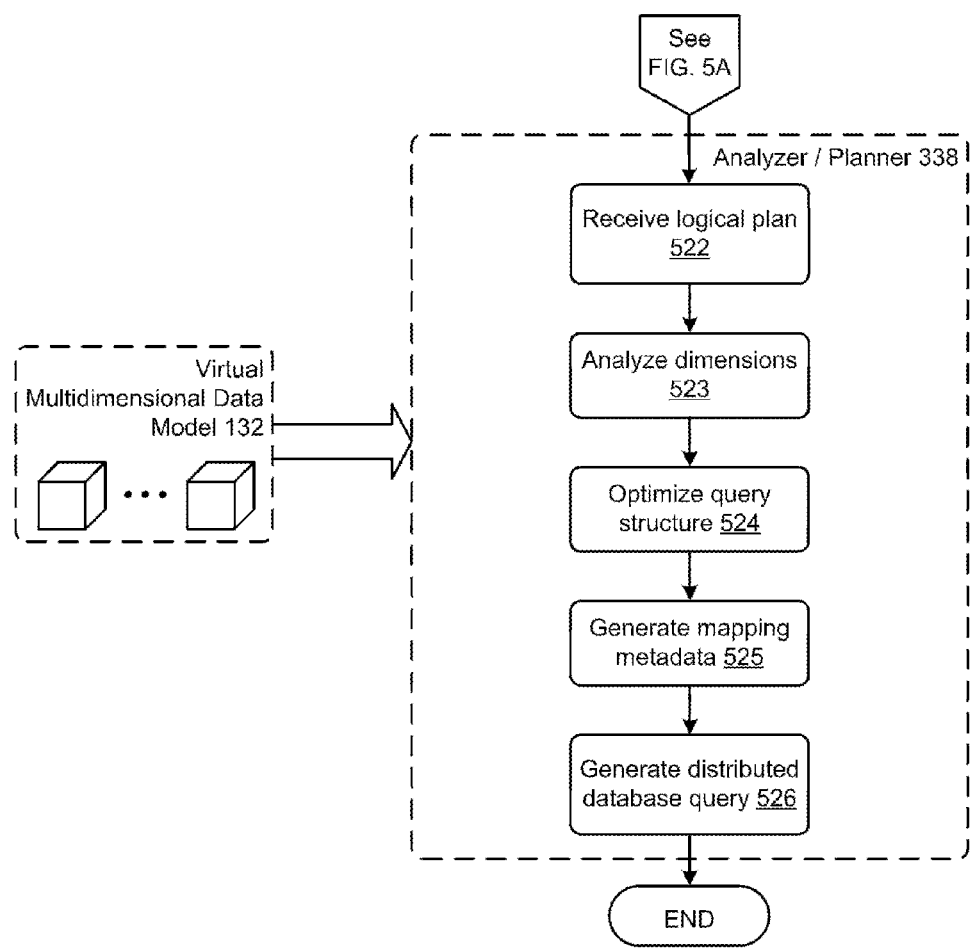
FIG. 5B depicts a flow for generating a subject database query in systems for interpreting relational database statements using a virtual multidimensional data model, according to an embodiment.

One embodiment of the techniques for using the aforementioned virtual multidimensional data model 132 to generate subject database statements for processing (e.g., querying) of a flat file, for example, is described in FIG. 5A and FIG. 5B.

FIG. 5A shows a flow 5A00 for formulating a logical plan in systems for interpreting relational database statements using a virtual multidimensional data model, according to an embodiment. As an option, one or more instances of flow 5A00 or any aspect thereof may be implemented in the context of the architecture and functionality of the embodiments described herein. Also, the flow 5A00 or any aspect thereof may be implemented in any desired environment.

The flow 5A00 presents one embodiment of a set of steps for formulating a logical plan (e.g., logical plan 307) from a relational database query (e.g., SQL query) for use in systems for interpreting relational database statements using a virtual multidimensional data model. In one or more embodiments, the steps and underlying operations comprising the flow 5A00 can be executed by program instructions stored on the multidimensional projector 336 included in the data analytics engine 130. Specifically, flow 5A00 starts with receiving a relational database statement (see step 502). For example, the relational database statement can be issued by user 102 using the analysis tools 103. The relational database statement is then checked to determine if the relational database statement is a query (e.g., SQL query) or another type of statement (see decision 503). For example, the relational database statement can be a request for metadata and the multidimensional projector 336 can return the metadata (see step 504). If the relational database statement is a query, the flow 5A00 next checks whether a virtual data cube exists (e.g., in the virtual multidimensional data model 132) that corresponds to the parameters and attributes included in the relational database statement (see decision 505). If a virtual data cube does not exist and cannot be dynamically generated, the multidimensional projector 336 can return an error (see step 506).

If a virtual data cube exists that corresponds to the parameters and attributes included in the relational database statement, then flow 5A00 continues with identifying all of the attributes included in the relational database statement (see step 507). For example, an object tree representing the relational database statement can be traversed to determine all of the attributes included in the relational database statement (e.g., data selection, data origin, selection conditions, etc.). Flow 5A00 then continues with mapping the identified attributes in the relational database statement to the attributes of the virtual multidimensional data model 132 (see step 508). For example, the data selection attribute in the relational database statement can correspond to a measure in the virtual multidimensional data model, and/or can correspond to values of a dimensional attribute (e.g., the city in a geographic hierarchy or the calendar date in a time hierarchy). More specifically, the "Product Name" attribute (e.g., column) in the relational database statement can be mapped to the "name" attribute in the "dimproduct" hierarchy associated with "product key" in the virtual multidimensional data model.

The flow 5A00 continues with flagging and/or identifying various explicit and inferred relationships (e.g., "year" is a parent of "month") to be used in various operations (see step 509). For example, identifying relationships can enable the logical plan to be optimized for the hierarchical structure of the virtual multidimensional data model. A set of groupings associated with the relational database statement can then be determined (see step 510). For example, measures can be aggregated (e.g., in a "sum" function) and dimensions can be combined into a grouping (e.g., in a "GROUP BY" clause) based at least in part on flags and categorizations specified in the virtual multidimensional data model 132. In some cases, arithmetic functions in the relational database statement can be mapped to different functions providing an equivalent result in the virtual multidimensional data model.

When the attributes, relationships, and groupings have been identified and mapped, the logical plan can be formulated (see step 511). The resulting logical plan is an explicit representation (e.g., programming code objects) of all the attributes, relationships, and groupings that is structured such that it can be evaluated by a multidimensional query engine. For example, a set of attributes specifying a query for each month of year "2014" can be represented by "2014.children" in the logical plan.

FIG. 5B describes one embodiment of the techniques for generating a subject database query from the logical plan.

FIG. 5B depicts a flow 5B00 for generating a subject database query in systems for interpreting relational database statements using a virtual multidimensional data model, according to an embodiment. As an option, one or more instances of flow 5B00 or any aspect thereof may be implemented in the context of the architecture and functionality of the embodiments described herein. Also, the flow 5B00 or any aspect thereof may be implemented in any desired environment.

The flow 5B00 presents one embodiment of a set of steps for generating a subject database query (e.g., an instance of subject database statements 107) from a logical plan (e.g., logical plan 307) for use in systems for interpreting relational database statements using a virtual multidimensional data model. In one or more embodiments, the steps and underlying operations comprising the flow 5B00 can be executed by program instructions stored on the analyzer and planner 338 included in the data analytics engine 130. Specifically, flow 5B00 starts with receiving a logical plan (see step 522). For example, the logical plan can originate from the multidimensional projector as described in FIG. 3 and FIG. 5A. The flow 5B00 continues with analyzing the dimensions included in the logical plan (see step 523). For example, such analyzing can include collecting the dimensions in the logical plan, identifying the granularity of the dimensions (e.g., year, quarter, month, week, day, etc.), defining the multidimensional space in which query results will reside, and other operations. The flow 5B00 continues with defining an optimal set of structural attributes (e.g., clauses, operators, etc.) for the distributed data query (see step 524). For example, an optimal set of one or more paths to join and/or union the available tables in the subject database can be determined based at least in part on the attributes of the multidimensional space earlier defined. As another example, given the earlier defined multidimensional space and associated subject database tables, constraints can be identified (e.g., only query "2014.children" tables) to improve query performance (e.g., response times). In some cases, such constraints can be built into the subject database query or used in post-processing a result set. Query structure optimization can also address row relation calculations (e.g., quarter-over-quarter calculations, etc.). When the query structure has been defined and optimized, the flow 5B00 continues with generating a set of mapping metadata (see step 525). Such mapping metadata enables the query result set (e.g., result set 308) to be mapped back to a result set based at least in part on the original query semantics (e.g., visualization result set 309). The flow 5B00 continues with generating the subject database query (see step 526). For example, the subject database query can be an instance of the subject database statements 107 processed by the distributed data query engine 117 on the subject database 118 stored in the distributed data warehouse 111.

Figure 6:
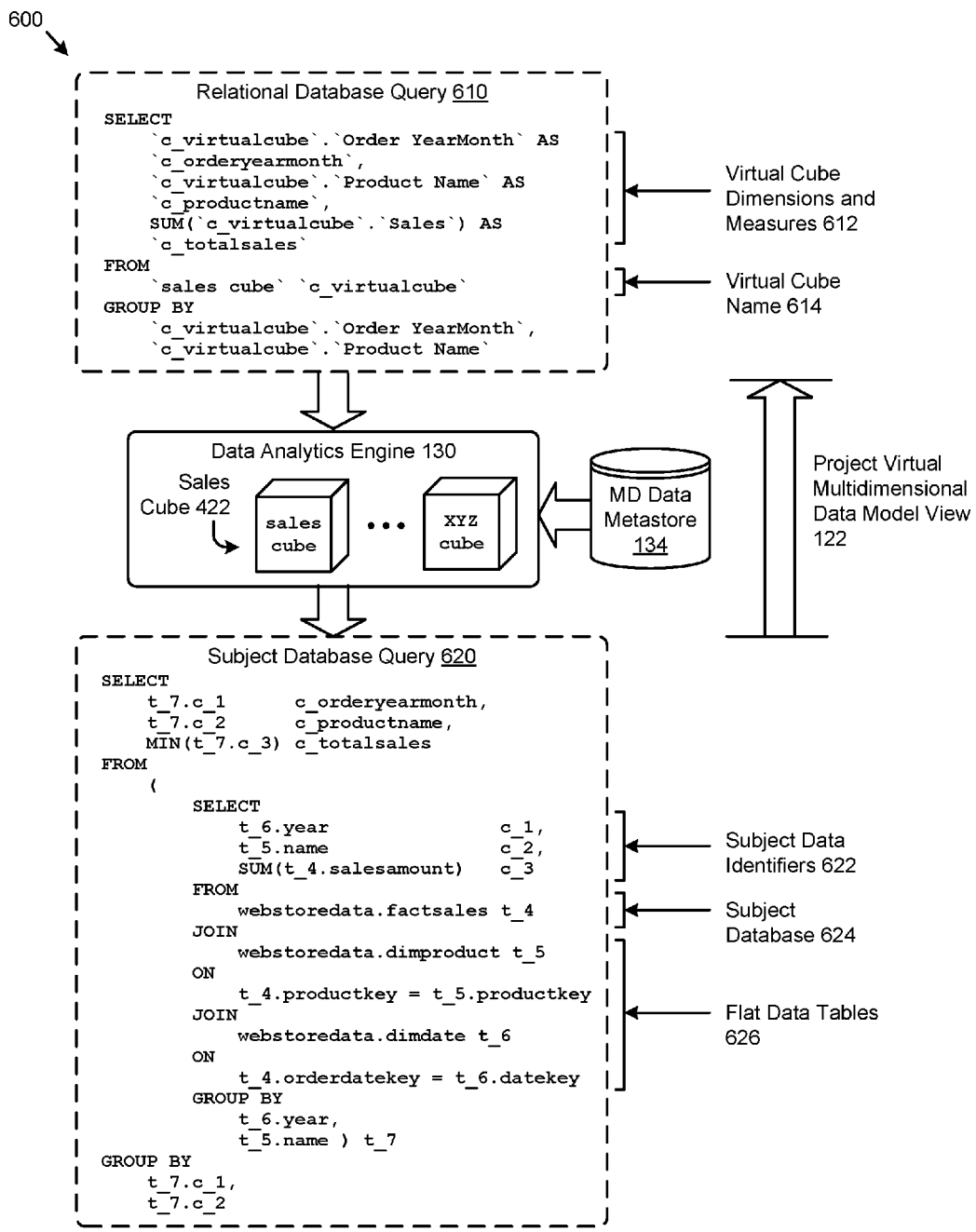
FIG. 6 presents a diagram showing example queries received and generated in systems for interpreting relational database statements using a virtual multidimensional data model, according to an embodiment.

An example relational database query received by the data analytics engine 130 (see step 502 of FIG. 5A) and a resulting example subject database query generated by the data analytics engine 130 (see step 526 of FIG. 5B) is presented in FIG. 6.

FIG. 6 presents a diagram 600 showing example queries received and generated in systems for interpreting relational database statements using a virtual multidimensional data model, according to an embodiment. As an option, one or more instances of diagram 600 or any aspect thereof may be implemented in the context of the architecture and functionality of the embodiments described herein. Also, the diagram 600 or any aspect thereof may be implemented in any desired environment.

The diagram 600 presents an example relational database query 610 received by the data analytics engine 130 and an example subject database query 620 generated by the data analytics engine 130. The example relational database query 610 can represent a relational query (e.g., SQL query) that a user can issue (e.g., using analysis tools 103) on a subject database (e.g., flat file database, multidimensional database, etc.) using the herein disclosed techniques. In one or more embodiments, the herein disclosed techniques can receive the example relational database query 610 and generate the example subject database query 620 shown for execution on a subject database query engine. The examples in diagram 600 conform to SQL syntax, but other query languages are possible.

As shown in diagram 600, the example relational database query 610 comprises attributes specifying a table "sales cube" and a set of columns (e.g., "Order YearMonth", "Product Name", and "sales") that are mapped to a virtual cube name 614 and a set of virtual cube dimensions and measures 612, respectively, that describe at least in part the sales cube 422. Further, the example subject database query 620 comprises attributes corresponding to a subject database 624 named "fact sales" that is stored in a data warehouse named "webstoredata" and includes a set of subject data identifiers 622 (e.g., "year", "name", and "salesamount"). For example, the subject data identifiers 622 can be included in a subject data metastore (e.g., subject data metastore 113) and describe the keys corresponding to the respective data values in a set of delimited flat file data. The example subject database query 620 further comprises a reference to a set of flat data tables 626 corresponding to the hierarchies associated with "productkey" and "orderdatekey" (e.g., table "dimproduct", and table "dimdate").

As illustrated in diagram 600, the sales cube 422 is included in a virtual multidimensional data model view of the subject database, and is used to enable transformation of the relational database query 610 to the subject database query 620, such that the relational database query 610 can be interpreted on the subject database for real-time multidimensional data analyses of the subject database.

Additional Embodiments of the Disclosure

Additional Practical Application Examples

Figure 7:
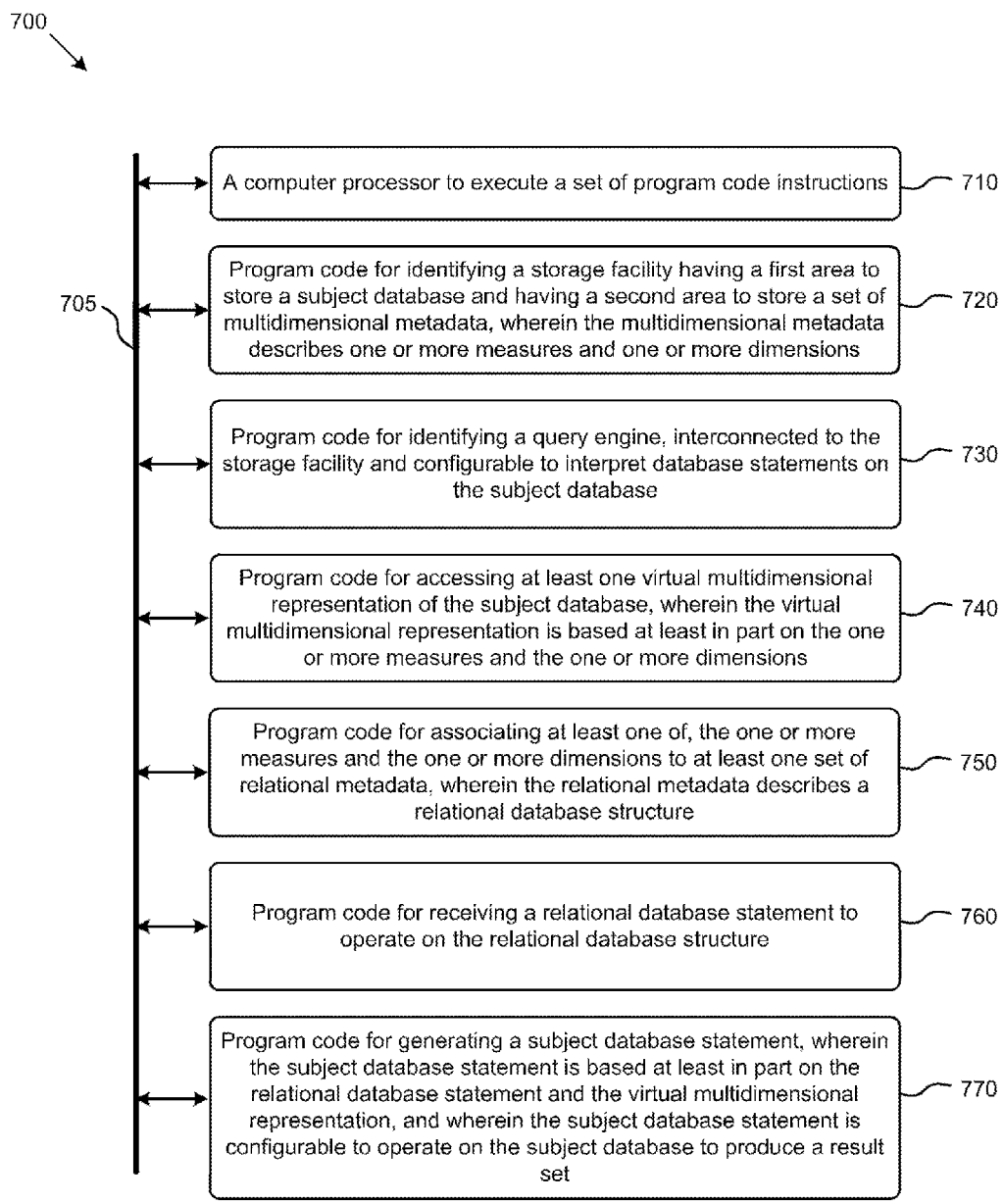
FIG. 7 depicts a system as an arrangement of computing modules that are interconnected so as to operate cooperatively to implement any of the herein-disclosed embodiments.

FIG. 7 depicts a block diagram of a system to perform certain functions of a computer system. As an option, the present system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The shown embodiment in FIG. 7 implements a portion of a computer system, shown as system 700, comprising a computer processor to execute a set of program code instructions (see module 710) and modules for accessing memory to hold program code instructions to perform: identifying a storage facility having a first area to store a subject database and having a second area to store a set of multidimensional metadata, wherein the multidimensional metadata describes one or more measures and one or more dimensions (see module 720); identifying a query engine, interconnected to the storage facility and configurable to interpret database statements on the subject database (see module 730); accessing at least one virtual multidimensional representation of the subject database, wherein the virtual multidimensional representation is based at least in part on the one or more measures and the one or more dimensions (see module 740); associating at least one of, the one or more measures and the one or more dimensions to at least one set of relational metadata, wherein the relational metadata describes a relational database structure (see module 750); receiving a relational database statement to operate on the relational database structure (see module 760); generating a subject database statement, wherein the subject database statement is based at least in part on the relational database statement and the virtual multidimensional representation, and wherein the subject database statement is configurable to operate on the subject database to produce a result set (see module 770).

System Architecture Overview

Additional System Architecture Examples

Figure 8A:
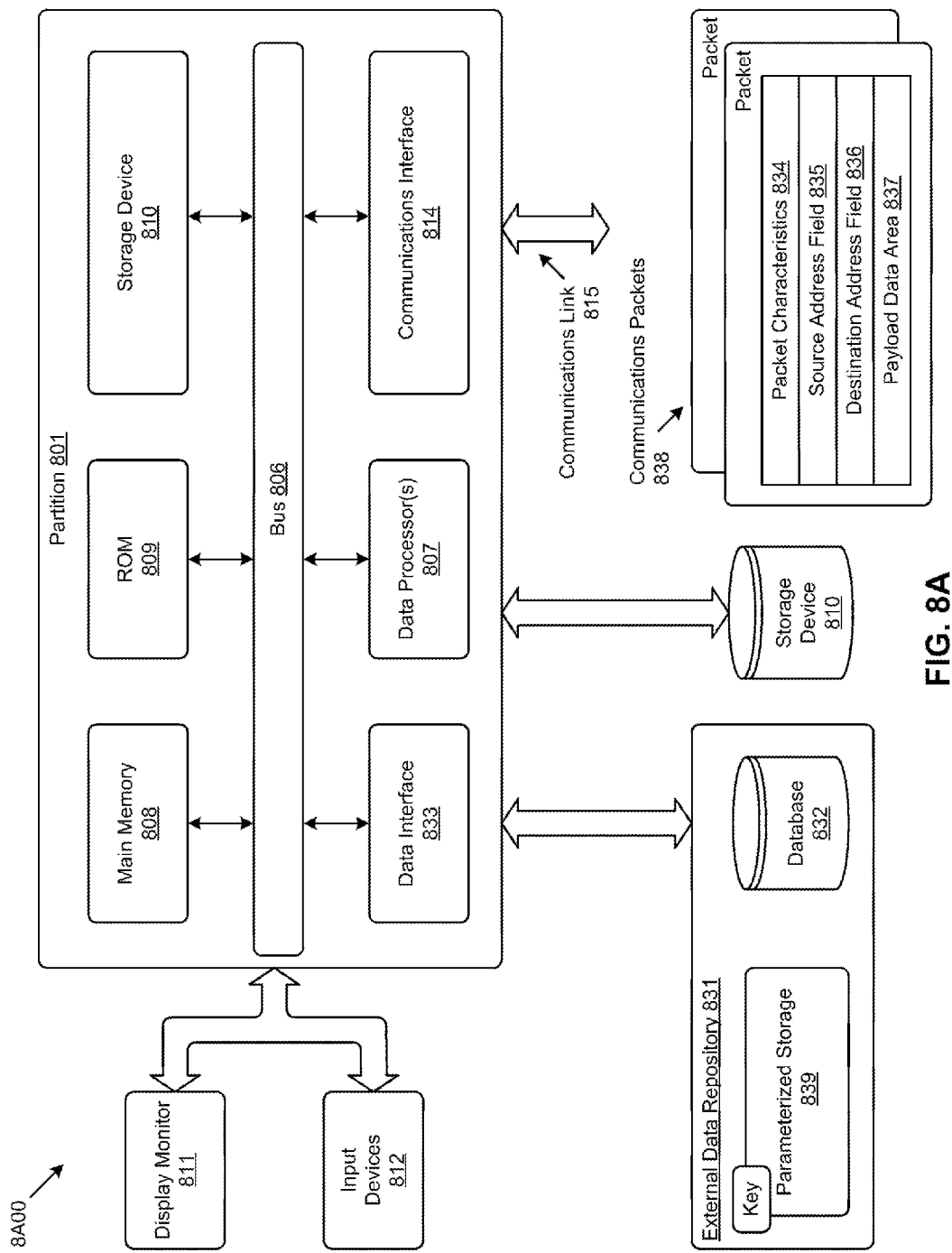
FIG. 8A and FIG. 8B depict exemplary architectures of components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information, which interconnects subsystems and devices such as a processor 807, a system memory (e.g., main memory 808, or an area of random access memory RAM), a static storage device (e.g., ROM 809), an internal or external storage device 810 (e.g., magnetic or optical), a data interface 833, a communication interface 814 (e.g., PHY, MAC, Ethernet interface, modem, etc.), a display 811 (e.g., CRT or LCD), input devices 812 (e.g., keyboard, cursor control), and an external data repository 831.

According to an embodiment of the disclosure, computer system 8A00 performs specific operations by processor 807 executing one or more sequences of one or more instructions contained in system memory. Such instructions may be read into system memory from another computer readable/usable medium such as a static storage device or a disk drive. The sequences can be organized to be accessed by one or more processing entities configurable to execute a single process or configurable to execute multiple concurrent processes to perform work. A processing entity can be hardware-based (e.g., involving one or more cores) or software-based or can be formed using a combination of hardware and software that implements logic, and/or can carry out computations and/or processing steps using one or more processes and/or one or more tasks and/or one or more threads or any combination therefrom.

According to an embodiment of the disclosure, computer system 8A00 performs specific networking operations using one or more instances of communication interface 814. Instances of the communication interface 814 may comprise one or more networking ports that are configurable (e.g., pertaining to speed, protocol, physical layer characteristics, media access characteristics, etc.) and any particular instance of the communication interface 814 or network access port thereto can be configured differently from any other particular instance. Portions of a communication protocol can be carried out in whole or in part by any instance of the communication interface 814, and data (e.g., packets, data structures, bit fields, etc.) can be positioned in storage locations within communication interface 814, or within system memory, and such data can be accessed (e.g., using random access addressing, or using direct memory access DMA, etc.) by devices such as processor 807.

The communications link 815 can be configurable to transmit (e.g., send, receive, signal, etc.) communications packets 838 comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics 834 include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data. Such data can be stored, for example, in any form of external data repository 831, which in turn can be formatted into any one or more storage areas, and which can comprise parameterized storage 839 accessible by a key (e.g., filename, table name, block address, offset address, etc.).

In an embodiment of the disclosure, execution of the sequences of instructions to practice the disclosure is performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages, data, and instructions including programs (e.g., application code), through communications link 815 and communication interface 814. Received program code may be executed by processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configurable to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a processor 807. Some embodiments include one or more special-purpose hardware components (e.g., power control, logic, sensors, transducers, etc.). A module may include one or more state machines and/or combinational logic used to implement or facilitate the performance characteristics of interpreting relational database statements using a virtual multidimensional data model.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of interpreting relational database statements using a virtual multidimensional data model). Such files or records can be brought into and/or stored in volatile or non-volatile memory.

Figure 8B:
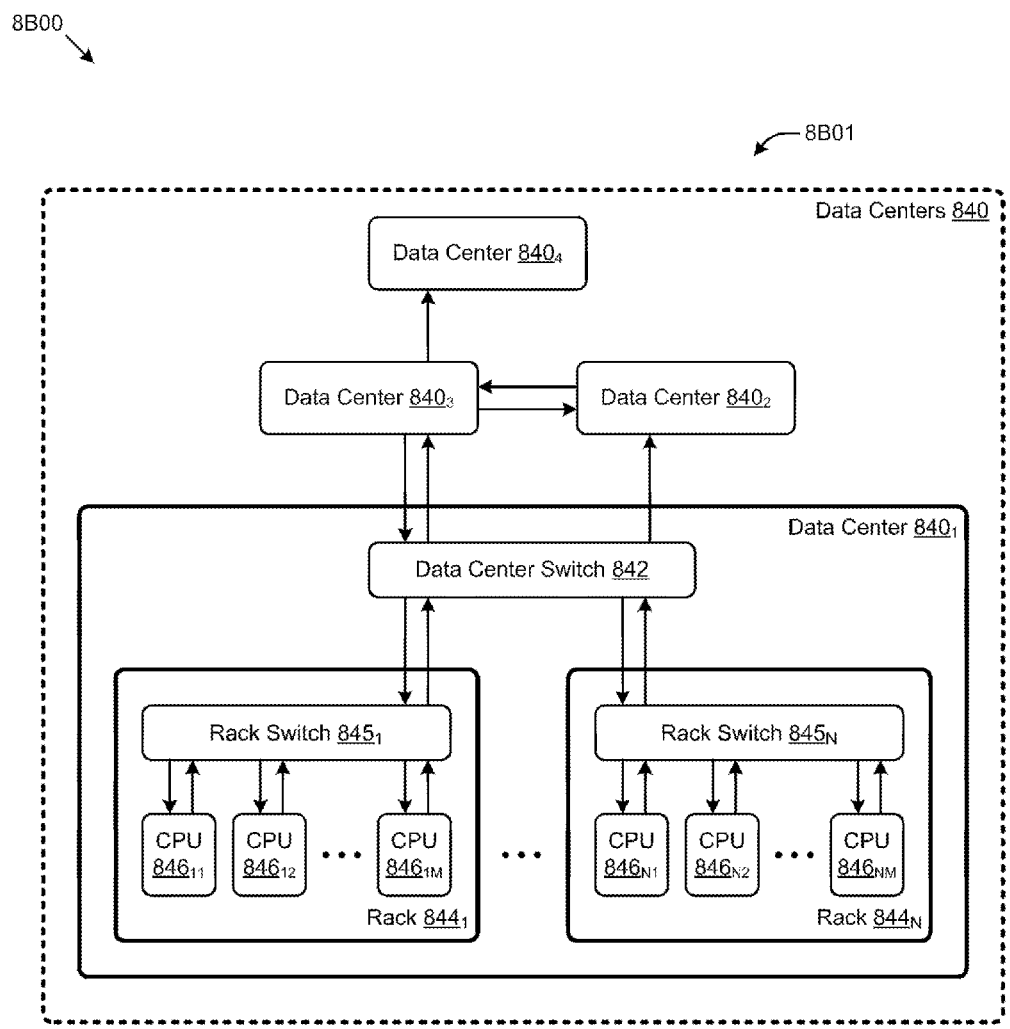

FIG. 8B depicts a block diagram 8B00 of an instance of a distributed data processing system 8B01 that may be included in a system implementing instances of the herein-disclosed embodiments. Distributed data processing system 8B01 may include many more or fewer components than those shown. The distributed data processing system 8B01 is used to store data, perform computational tasks, and transmit data between a plurality of data centers 840 (e.g., data center $840_1$, data center $840_2$, data center $840_3$, and data center $840_4$). The distributed data processing system 8B01 may include any number of data centers. Some of the plurality of data centers 840 may be located geographically close to each other, and others may be located far from the other data centers.

The components of distributed data processing system 8B01 may communicate using dedicated optical links or other dedicated communication channels, and supporting hardware such as modems, bridges, routers, switches, wireless antennas and towers, and the like. In some embodiments, the component interconnections of the distributed data processing system 8B01 include one or more wide area networks (WANs) as well as one or more local area networks (LANs). In some embodiments, the distributed data processing system 8B01 utilizes a private network, such that a portion or all of the component interconnections of the distributed data processing system 8B01 are designed and operated exclusively for a particular company or customer. Alternatively, a public network may be used.

In some embodiments, each data center includes multiple racks that each include frames and/or cabinets into which computing devices can be mounted. For example, as shown, data center $840_1$ includes a plurality of racks (e.g., rack $844_1$ to rack $844_N$), each comprising one or more computing devices. More specifically, rack $844_1$ includes a first set of CPUs (e.g., CPU $846_{11}$, CPU $846_{12}$, to CPU $846_{1M}$), and rack $844_N$ includes an Nth set of CPUs (e.g., CPU $846_{N1}$, CPU $846_{N2}$, to CPU $846_{NM}$). The plurality of CPUs can include data processors, network attached storage devices, and other computer controlled devices. In some embodiments, at least one of the plurality of CPUs operates as a master processor, and controls the scheduling and data distribution and processing tasks performed throughout the distributed data processing system 8B01. In some embodiments, one or more of the plurality of CPUs may take on one or more roles, such as a master and/or slave. One or more of the plurality of racks can further include storage (e.g., one or more network attached disks) that is shared by the one or more of the plurality of CPUs.

In some embodiments, the CPUs within a respective rack are interconnected by a rack switch. For example, the CPUs in rack $844_1$ are interconnected by a rack switch $845_1$ and the CPUs in rack $844_N$ are interconnected by a rack switch $845_N$.

Further, the plurality of racks within data center 840₁ are interconnected by a data center switch 842. The distributed data processing system 8B01 can be implemented using other arrangements and partitioning of multiple interconnected processors, racks, and switches. For example, in some embodiments, the plurality of CPUs can be replaced by a single large-scale multiprocessor.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
   identifying a storage facility having a first area to store a subject database and having a second area to store a schema that characterizes the subject database, wherein the schema is described by database schema metadata;
   identifying a query engine, interconnected to the storage facility and configured to interpret subject database statements on the subject database;
   generating, from the schema, relational metadata describing a relational database structure, wherein the relational metadata is based at least in part on the database schema metadata comprising the schema;
   receiving at least one relational database statement conforming to the relational metadata generated at least in part from the schema, wherein the at least one relational database statement is characterized by a first set of attributes;
   generating, responsive to receiving the at least one relational database statement, at least one virtual multidimensional representation of the subject database, wherein the at least one virtual multidimensional representation is characterized by a second set of attributes, and wherein at least one of the second set of attributes is determined based at least in part on at least one of the first set of attributes that characterize the at least one relational database statement; and
   generating at least one subject database statement to issue to the query engine, wherein the at least one subject database statement is based at least in part on at least one of the second set of attributes.

2. The method of claim 1, wherein generating the at least one subject database statement comprises identifying one or more dimensions from the second set of attributes, and wherein the at least one subject database statement is based at least in part on the one or more dimensions.

3. The method of claim 2, wherein the one or more dimensions describe a multidimensional space.

4. The method of claim 1, wherein generating the at least one subject database statement comprises selecting one or more structural attributes, wherein the structural attributes are selected based at least in part on at least one of, the first set of attributes that characterize the at least one relational database statement, the second set of attributes, or the schema, and wherein the at least one subject database statement is based at least in part on the one or more structural attributes.

5. The method of claim 4, wherein the one or more structural attributes comprise at least one of: one or more clauses, one or more operators, or any combination thereof.

6. The method of claim 4, wherein selecting at least one of the one or more structural attributes is based at least in part on a query performance metric.

7. The method of claim 1, further comprising generating mapping metadata, wherein the mapping metadata is based at least in part on at least one of the first set of attributes that characterize the at least one relational database statement, or the second set of attributes, and wherein the mapping metadata maps a query result set produced by the at least one subject database statement to a visualization result set.

8. The method of claim 1, wherein the second set of attributes comprise at least one of: one or more dimensions, one or more measures, or one or more relationships.

9. The method of claim 1, wherein generating the at least one subject database statement comprises mapping at least one of the first set of attributes that characterize the at least one relational database statement to at least one of the second set of attributes.

10. The method of claim 1, wherein generating the at least one subject database statement comprises determining at least one of one or more inferred relationships, or one or more groupings, wherein the one or more inferred relationships, or the one or more groupings are determined based at least in part on the first set of attributes that characterize the at least one relational database statement.

11. A computer program product, embodied in a non-transitory computer readable medium, the non-transitory computer readable medium having stored thereon a sequence of instructions which, when executed by a processor causes the processor to execute a process, the process comprising:
   generating, from a schema characterizing a subject database, relational metadata describing a relational database structure, wherein the relational metadata is based at least in part on database schema metadata comprising the schema;
   receiving at least one relational database statement conforming to the relational metadata generated at least in part from the schema, wherein the at least one relational database statement is characterized by a first set of attributes;
   generating, responsive to receiving the at least one relational database statement, at least one virtual multidimensional representation of the subject database, wherein the at least one virtual multidimensional representation is characterized by a second set of attributes, and wherein at least one of the second set of attributes is determined based at least in part on at least one of the first set of attributes that characterize the at least one relational database statement; and
   generating at least one subject database statement to issue to a query engine to interpret on the subject database, wherein the at least one subject database statement is based at least in part on at least one of the second set of attributes.

12. The computer program product of claim 11, wherein generating the at least one subject database statement comprises identifying one or more dimensions from the second set of attributes, and wherein the at least one subject database statement is based at least in part on the one or more dimensions.

13. The computer program product of claim 11, wherein generating the at least one subject database statement comprises selecting one or more structural attributes, wherein the structural attributes are selected based at least in part on at least one of: the first set of attributes, the second set of attributes, or the schema, and wherein the at least one subject database statement is based at least in part on the one or more structural attributes.

14. The computer program product of claim 11, wherein the process further comprises instructions for generating mapping metadata, wherein the mapping metadata is based at least in part on at least one of the first set of attributes, or the second set of attributes, and wherein the mapping metadata maps a query result set produced by the at least one subject database statement to a visualization result set.

15. The computer program product of claim 11, wherein generating the at least one subject database statement comprises mapping at least one of the first set of attributes to at least one of the second set of attributes.

16. The computer program product of claim 11, wherein generating the at least one subject database statement comprises determining at least one of one or more inferred relationships, or one or more groupings, wherein the one or more inferred relationships, or the one or more groupings are determined based at least in part on the first set of attributes.

17. A system comprising:
- a network access port to communicate over a bus to a query engine, wherein the query engine is interconnected to a storage facility having a first area to store a subject database and having a second area to store a schema that characterizes the subject database, and wherein the query engine interprets subject database statements on the subject database;
- a data analytics engine comprising a processor to receive communications over the network access port, and to perform operations of, generating, from the schema, relational metadata describing a relational database structure, wherein the relational metadata is based at least in part on database schema metadata comprising the schema;
- receiving at least one relational database statement conforming to the relational metadata generated at least in part from the schema, wherein the at least one relational database statement is characterized by a first set of attributes;
- generating, responsive to receiving the at least one relational database statement, at least one virtual multidimensional representation of the subject database, wherein the at least one virtual multidimensional representation is characterized by a second set of attributes, and wherein at least one of the second set of attributes is determined based at least in part on at least one of the first set of attributes that characterize the at least one relational database statement; and
- generating at least one subject database statement to issue to the query engine, wherein the at least one subject database statement is based at least in part on at least one of the second set of attributes.

18. The system of claim 17, wherein acts of generating the at least one subject database statement comprise identifying one or more dimensions from the second set of attributes, and wherein the at least one subject database statement is based at least in part on the one or more dimensions.

19. The system of claim 17, wherein acts of generating the at least one subject database statement comprise selecting one or more structural attributes, wherein the structural attributes are selected based at least in part on at least one of: the first set of attributes, the second set of attributes, or the schema, and wherein the at least one subject database statement is based at least in part on the one or more structural attributes.

20. The system of claim 17, wherein operations performed at the data analytics engine further comprise generating mapping metadata, wherein the mapping metadata is based at least in part on at least one of the first set of attributes, or the second set of attributes, and wherein the mapping metadata maps a query result set produced by the at least one subject database statement to a visualization result set.

* * * * *